(No Model.)
J. B. SPATZ.
SAUSAGE STUFFER
No. 498,317. Patented May 30, 1893.
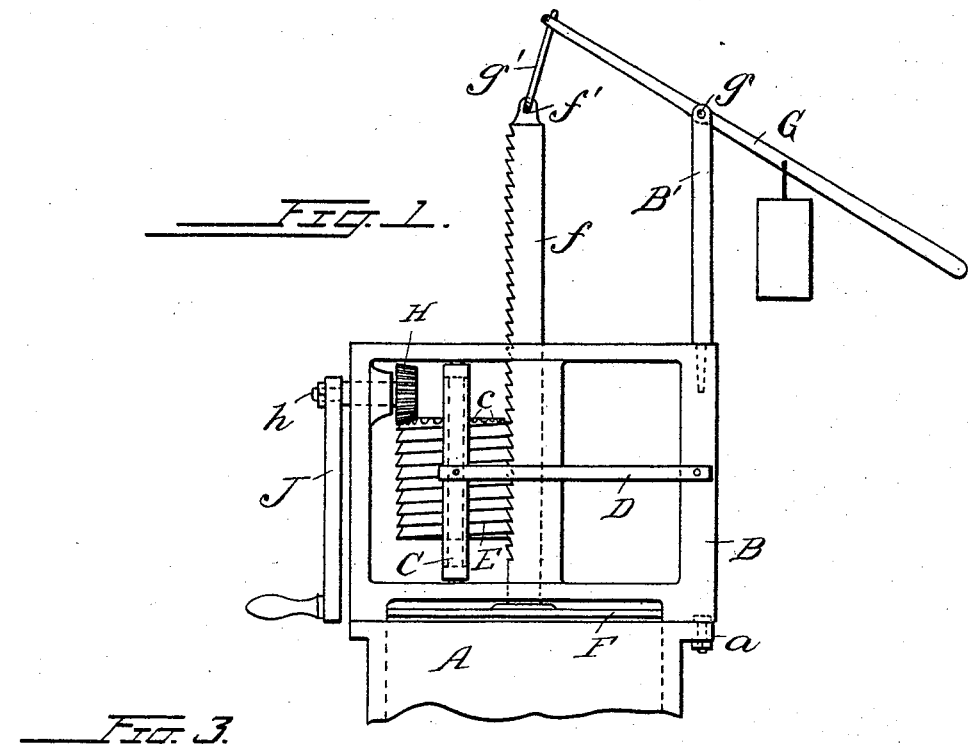
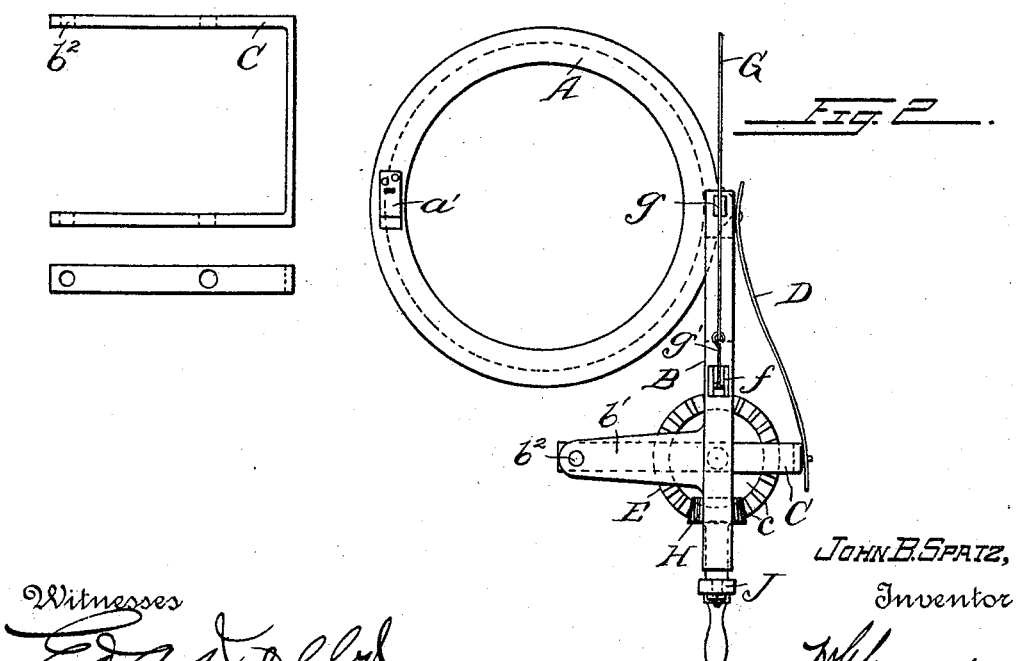
Witnesses
Ed. A. Kelly
Adam L. Otterbein.
John B. Spatz,
Inventor
By his Attorney
W. F. Stewart

UNITED STATES PATENT OFFICE.

JOHN B. SPATZ, OF STRAUSSTOWN, PENNSYLVANIA.

SAUSAGE-STUFFER.

SPECIFICATION forming part of Letters Patent No. 498,317, dated May 30, 1893.

Application filed February 16, 1893. Serial No. 462,660. (No model.)

*To all whom it may concern:*

Be it known that I, JOHN B. SPATZ, a citizen of the United States, residing at Strausstown, in the county of Berks, State of Pennsylvania, have invented certain Improvements in Sausage-Stuffers, of which the following is a specification.

This invention relates to certain improvements in sausage stuffing machines which are fully described in connection with the accompanying drawings and are specifically pointed out in the claims.

The invention relates to the mechanism for operating the piston.

Figure 1 is an elevation showing the upper portion of the hopper of a sausage stuffing machine with my improved operating mechanism applied thereto. Fig. 2 is a plan view of the same showing the operating mechanism swung to one side to permit the convenient filling of the hopper. Fig. 3 is a detail view of the pivoted arm.

A represents the hopper, the lower portion of which is not shown being of any ordinary construction.

B is the head which carries the operating gear. The piston F is provided with a rod $f$ which forms a rack as usual and passes upward through the head in which it is guided. The gearing for operating the piston consists of a worm E which engages the rack $f$ and the upper face of which is provided with teeth $c$ which are engaged by a pinion H mounted in the head B on a shaft $h$ which is provided with an operating crank J. The worm E is mounted on an arm C which is pivoted at $b^2$ (Fig. 2) to a lug or side extension $b'$ of the head B. The arm is thus free to swing toward or away from the rack so as to throw the worm in or out of gear with the latter, and the spring catch is provided to lock it in gear when it is desired to press down the piston by turning the crank. When the hopper is emptied the piston is lifted rapidly by merely releasing the catch D and pulling the worm out of gear, the upper end of the rack being connected at $f'$ by means of a link $g'$ to a lifting lever G which is fulcrumed at G to a post B' on the head B. In order to permit the hopper to be conveniently filled the head B is pivoted at $a$ to the top of the hopper so as to be capable of swinging to one side as indicated in Fig. 2. Any suitable locking mechanism as a spring catch $a'$, may be provided to lock it in central position above the hopper when the latter is filled.

The convenience and simplicity of my improved mechanism will readily be appreciated. I do not limit myself to the exact details of construction shown and described, but—

What I claim is—

1. In a sausage stuffing machine the combination with the hopper and the piston with rack, of the operating mechanism consisting of a head B through which the rack passes, a worm E having bearings in an arm C pivoted to said head and arranged to swing the worm in and out of gear with the rack, a pinion H arranged to operate said worms, and means for locking the worm in gear with the rack, substantially as set forth.

2. In a sausage stuffing machine the combination with the hopper and the piston with rack, of the swinging head B through which the rack passes, the arm C pivoted to said head, the worm E mounted in said arm, the pinion H gearing with the worm, and mechanism for locking the swinging head in central position above the hopper, for locking the worm in gear with the rack, and for lifting the piston when said worm is thrown out of gear, all arranged and operated substantially as set forth.

In testimony whereof I affix my signature in presence of two witnesses.

JOHN B. SPATZ.

Witnesses:
J. B. C. WEIBLE,
WM. H. RENTSCHLER.